United States Patent
Yuk et al.

(10) Patent No.: US 12,148,916 B2
(45) Date of Patent: Nov. 19, 2024

(54) METAL-DOPED SODIUM VANADIUM FLUOROPHOSPHATE/SODIUM VANADIUM PHOSPHATE (NA3V2(PO4)2F3/NA3V2(PO4)3) COMPOSITE FOR SODIUM-ION STORAGE MATERIAL

(71) Applicant: KOREA ADVANCED INSTITUTE OF SCIENCE AND TECHNOLOGY, Daejeon (KR)

(72) Inventors: Jong Min Yuk, Daejeon (KR); Jae Yeol Park, Daejeon (KR); Ho Jun Lee, Daejeon (KR); Jungjae Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/152,728

(22) Filed: Jan. 19, 2021

(65) Prior Publication Data
US 2021/0242451 A1 Aug. 5, 2021

(30) Foreign Application Priority Data
Feb. 4, 2020 (KR) .................. 10-2020-0013120
Oct. 23, 2020 (KR) .................. 10-2020-0138384

(51) Int. Cl.
*H01M 4/36* (2006.01)
*C01B 25/455* (2006.01)
(Continued)

(52) U.S. Cl.
CPC ........... *H01M 4/364* (2013.01); *C01B 25/455* (2013.01); *H01M 4/5825* (2013.01);
(Continued)

(58) Field of Classification Search
None
See application file for complete search history.

(56) References Cited

U.S. PATENT DOCUMENTS

2002/0192553 A1* 12/2002 Barker .................. C01B 25/455
429/231.9

FOREIGN PATENT DOCUMENTS

| CN | 108134081 A | | 6/2018 |
| CN | 109755565 A | * | 5/2019 |
| KR | 20150045818 A | | 4/2015 |

OTHER PUBLICATIONS

Zhang et al., Synthesis of uniform hierarchical Na3V1.95Mn0.05(PO4)2F3@C hollow microspheres as a cathode material for sodium-ion batteries., 2018, J. Mater. A., 6, 4525 (Year: 2018).*

(Continued)

*Primary Examiner* — Daniel S Gatewood
(74) *Attorney, Agent, or Firm* — INVENSTONE PATENT, LLC.; Daniel Chung (57) ABSTRACT

The present disclosure relates to a sodium-ion storage material including a doped compound, and an electrode material for a sodium-ion battery, an electrode for a sodium-ion battery, and a sodium-ion battery, which include the sodium-ion storage material. Specifically, the sodium-ion storage material may include a compound consisting of an $Na_3V_{2-x}M_x(PO_4)_2F_3/Na_3V_{2-y}M_y(PO_4)_3$ composite (M=Fe, Mn, Cr, Cu, Zn or Ti, $0<x,y\leq2$). When the sodium-ion storage material according to the present disclosure is used, it may maintain high discharge capacity while reducing the vanadium content, and when the sodium-ion storage material is applied to a sodium-ion secondary battery or a sodium-magnesium hybrid-ion battery, the battery may exhibit excellent charge/discharge cycle characteristics.

14 Claims, 11 Drawing Sheets (51) Int. Cl.
*H01M 4/58* (2010.01)
*H01M 4/62* (2006.01)
*H01M 10/054* (2010.01)

(52) U.S. Cl.
CPC ......... *H01M 4/622* (2013.01); *H01M 10/054* (2013.01); *C01P 2002/52* (2013.01); *C01P 2002/72* (2013.01); *C01P 2004/04* (2013.01); *C01P 2006/40* (2013.01)

(56) References Cited

OTHER PUBLICATIONS

Materials and Design. Elsevier. Oct. 22, 2019, vol. 186.

* cited by examiner

METAL-DOPED SODIUM VANADIUM FLUOROPHOSPHATE/SODIUM VANADIUM PHOSPHATE (NA3V2(PO4)2F3/NA3V2(PO4)3) COMPOSITE FOR SODIUM-ION STORAGE MATERIAL

CROSS-REFERENCE TO RELATED APPLICATION

This application claims priority to Korean Patent Application No. 10-2020-0013120, filed on Feb. 4, 2020 and No. 10-2020-0138384, filed on Oct. 23, 2020 the disclosure of which is incorporated herein by reference in its entirety.

STATEMENT REGARDING THIRD PARTY RESEARCH PROJECT

This invention was supported by the National Research Foundation of Korea (NRF) grant funded by the Korean government (MSIP; Ministry of Science, ICT & Future Planning) (NRF-2018M3A7B4065625), by the KAIST-funded Global Singularity Research Program for 2019, and by the KAIST end-run project (title: Development of sodium ion battery full cell with bulk CuS anode and Na3V1.65Fe0.35(PO4)2F3/Na3V1.65Fe0.35(PO4)3), which provided support for electrode material preparation and electrochemical measurement; NRF grant funded by the Korean government (MSIP; Ministry of Science, ICT & Future Planning) (NRF2016M3A7B4024138), which provided support for the DFT calculation; Global Research Development Center Program through the NRF funded by the Ministry of Science and ICT (MSIT) (2015K1A4A3047100), which provided support for the chemical analysis of the electrode materials; NRF grant funded by the Korean government (MSIP; Ministry of Science, ICT & Future Planning) (NRF2016M3A7B4024138), which provided a scholarship support for Jae Yeol Park.

BACKGROUND

Technical Field

The present disclosure relates to a sodium-ion storage material including a doped compound, and an electrode material for a sodium-ion battery, an electrode for a sodium-ion battery, and a sodium-ion battery, which include the sodium-ion storage material.

Description of the Related Art

A secondary battery, which has a low production cost and is based on sodium widely distributed on the earth, may be considered the most suitable energy storage source for the next-generation energy storage system. In addition, sodium is an element belonging to the same group of the periodic table as lithium, and the sodium-based secondary battery has an advantage in that it may be produced using an existing production base which has been used for a lithium secondary battery, because it is similar to the lithium secondary battery in terms of the electrochemical behavior and production method thereof.

In recent years, research on sodium-based secondary batteries using sodium instead of lithium has been re-examined. The reserves of sodium resources are abundant, and if it is possible to produce a secondary battery using sodium instead of lithium, the secondary battery may be produced at low costs. In addition, expensive nickel and cobalt may not be used as positive electrode materials for sodium ion batteries, unlike lithium ion batteries that essentially use nickel and cobalt as positive electrode materials.

However, sodium secondary batteries have physical properties different from existing lithium secondary batteries, and thus show low properties in terms of output power and energy storage density. An energy storage system is a system that stores power, generated by solar cells or wind power generation, at a time when the demand therefor is small, and then supplies energy at a time when energy demand rises sharply. For efficient driving, it is important to construct a large-capacity storage system at a relatively low cost rather than a storage system having high energy and power densities.

Therefore, studies have been actively conducted on positive electrode active materials which are important materials for commercialization of such sodium ion batteries. In particular, among various positive electrode materials, polyanion-based $Na_3V_2(PO_4)_2F_3$ (NVPF), $Na_3V_2O_2(PO_4)F$ (NVOPF) and $Na_3V_2(PO_4)_3$ (NVP), which have high energy density and power density and also have excellent cycle stability, have been intensively studied. However, these three materials contain a large amount of vanadium, and the high price of vanadium is a major obstacle to commercialization. The price of vanadium is similar to that of nickel. Therefore, it is essential to reduce the vanadium content for commercialization.

PATENT DOCUMENTS

Korean Patent Application Publication No. 10-2015-0045818 (published on Apr. 29, 2015)

SUMMARY

An object of the present disclosure is to provide a sodium-ion-storage material capable of exhibiting excellent charge/discharge cycle characteristics while having a reduced vanadium content and improved discharge capacity.

Another object of the present disclosure is to provide an electrode material for a sodium-ion battery capable of exhibiting excellent charge/discharge cycle characteristics while having improved discharge capacity.

Still another object of the present disclosure is to provide a sodium-ion battery and a magnesium-sodium hybrid-ion battery, which are capable of exhibiting excellent charge/discharge cycle characteristics while having improved discharge capacity.

Other objects and advantages of the present disclosure will be more clearly understood from the following detailed description of the disclosure, the appended claims and the accompanying drawings.

In accordance with one embodiment of the present disclosure, the present disclosure is directed to a sodium-ion storage material including $Na_3V_{2-x}M_x(PO_4)_2F_3/Na_3V_{2-x}M_x(PO_4)_3$ (M=Fe, Zn, Cr, Mn, Cu or Zn, and 0<x<2).

In the present disclosure, the electrode material may further include a binder.

In the present disclosure, the binder may include one or more selected from the group consisting of polyvinylidene fluoride, polyvinyl alcohol, polyacrylic acid, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, and fluorinated rubber.

In the present disclosure, the electrode material may further include an electrically conductive material.

In accordance with another embodiment of the present disclosure, the present disclosure is directed to an electrode for a sodium-ion battery including the electrode material according to the present disclosure.

In accordance with still another embodiment of the present disclosure, the present disclosure is directed to a sodium-ion battery including: the electrode according to the present disclosure and an electrolyte.

DESCRIPTION OF SPECIFIC EMBODIMENTS

Hereinafter, preferred embodiments of the present disclosure will be described. However, the embodiments of the present disclosure may be modified into various other forms, and the scope of the present disclosure is not limited to the embodiments described below. In addition, the embodiments of the present disclosure are provided to more completely explain the present disclosure to those skilled in the art.

The present inventors have found that, when a compound doped with a transition metal is used as a sodium-ion storage material or an electrode material for a sodium-ion battery, it may reduce the vanadium content and, at the same time, the battery may exhibit excellent charge/discharge cycle characteristics while maintaining high discharge capacity, unlike a conventional battery.

According to one embodiment of the present disclosure, the present disclosure is directed to a sodium-ion storage material which may include a compound consisting of an $Na_3V_{2-x}M_x(PO_4)_2F_3/Na_3V_{2-x}M_x(PO_4)_3$ (0<x<2) composite. M in the $Na_3V_{2-x}M_x(PO_4)_2F_3/Na_3V_{2-x}M_x(PO_4)_3$ (0<x<2) composite is a metal, and the composite is doped with the metal. Preferably, M may be a transition metal. More preferably, M may be Fe. The transition metal may be doped into the composite in an amount of 0 to 15 atomic % based on the initial amount of vanadium in the composite. Although the transition metal was doped in an amount of up to about 15 atomic % in an Example of the present disclosure, it is obvious that the transition metal may be doped in an amount larger than 15 atomic % depending on experimental conditions.

The electrode active material may be coated with electrically conductive carbon in an amount of more than 2 wt % and not more than 5 wt %, preferably 2.5 wt % to 5 wt %, based on the weight of the electrode active material. If the amount of the electrically conductive carbon is excessively large, the amount of nanoplates may undesirably decrease, thus reducing the overall characteristics of the battery, and if the amount of the electrically conductive carbon is excessively small, the electrically conductive carbon may not exhibit the effect of improving electrical conductivity.

In the present disclosure, the electrode active material may be coated with an electrically conductive material in order to further improve the electrical conductivity thereof. In the present disclosure, the electrically conductive material may be one or more selected from the group consisting of electrically conductive carbon, precious metals, and metals. In particular, coating with electrically conductive carbon is preferable because it may effectively increase electrical conductivity without significantly increasing the production cost and weight.

In the present disclosure, the electrically conductive carbon may be one or more selected from the group consisting of carbon black, carbon nanotubes, and graphene, but is not limited thereto.

In the present disclosure, the electrode active material may be coated with the electrically conductive carbon in an amount of more than 2 wt % and not more than 5 wt %, preferably 2.5 wt % to 5 wt %, based on the weight of the electrode active material. If the amount of the electrically conductive carbon is excessively large, the amount of nanoplates may undesirably decrease, thus reducing the overall characteristics of the battery, and if the amount of the electrically conductive carbon is excessively small, the electrically conductive carbon may not exhibit the effect of improving electrical conductivity.

In the present disclosure, the electrically conductive carbon may be applied to the surface of electrode active material particles. For example, the electrically conductive carbon may coat the surface of the electrode active material particles to a thickness of 0.1 nm to 20 nm.

In the present disclosure, when the electrode active material particles are primary particles coated with the electrically conductive carbon in an amount of 0.5 to 1.5 wt % based on the total weight of the electrode active material, the thickness of the carbon coating layer may be about 0.1 nm to 2.0 nm.

In the present disclosure, the electrode material may further include a binder and optionally an electrically conductive material, in addition to the electrode active material.

In the present disclosure, the binder serves to facilitate the adhesion between the electrode active material particles and to improve the binding of the positive electrode active material to a current collector, and specific examples thereof include, but are not particularly limited to, polyvinylidene fluoride, polyvinyl alcohol, polyacrylic acid, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, fluorinated rubber, and various copolymers.

In the present disclosure, the binder may be included in an amount of 1 to 20 parts by weight based on 100 parts by weight of the electrode active material, but is not limited thereto.

In the present disclosure, a solvent for the binder is not particularly limited, but may be, for example, N-methylpyrrolidone (NMP), acetone or water.

In the present disclosure, the solvent is included in an amount of 1 to 10 parts by weight based on 100 parts by weight of the positive electrode active material in order to facilitate an operation of forming a negative electrode material.

In addition, the electrode material of the present disclosure may optionally further include an electrically conductive material in order to further improve electrical conductivity. As the electrically conductive material, any material that is generally used in a sodium-ion battery may be used, and examples thereof include carbon-based materials such as carbon black, acetylene black, Ketjen black, and carbon fibers; metal-based materials such as metal powder or metal fibers such as copper, nickel, aluminum, and silver; electrically conductive polymers such as polyphenylene derivatives; or mixtures thereof. The content of the electrically conductive material that is used may be suitably controlled.

In addition, in the present disclosure, the particle size of the electrically conductive material is preferably 2 nm to 1 μm. If the particle size of the electrically conductive material is less than 2 nm, a problem may arise in that it is difficult to form a uniform slurry in a process of forming an electrode, and if the particle size is more than 1 μm, a problem may arise in that it is impossible to improve the electrical conductivity of the electrode.

In addition, in the present disclosure, the electrode active material and the electrically conductive material may be included at a weight ratio of, but not limited to, 9:1 to 99:1, more preferably 9:1.

As used herein, the terms "sodiate" and "sodiation" may refer to a process of adding sodium to the electrode material.

As used herein, the terms "desodiate" and "desodiation" may refer to a process of removing sodium from the electrode material.

As used herein, the terms "charge" and "charging" may refer to a process of providing electrochemical energy to a cell.

As used herein, the terms "discharge" and "discharging" refer to a process for removing electrochemical energy from a cell, for example, when using the cell to perform desired work.

As used herein, the term "positive electrode" may refer to an electrode (often called a cathode) where electrochemical reduction and sodiation occur during a discharging process.

As used herein, the term "negative electrode" may refer to an electrode (often called an anode) where electrochemical oxidation and desodiation occurs during a discharging process.

According to another embodiment of the present disclosure, the present disclosure is directed to a method for producing an electrode active material. The method may include steps of: (a) mixing sodium fluoride, ammonium metavanadate, ammonium phosphate monobasic and citric acid, followed by heating to form a precursor mixture; (b) drying the precursor mixture; and (c) heating the dried precursor mixture.

Each step of the method according to the present disclosure will now be described in detail.

Step (a): Sodium fluoride, ammonium metavanadate, ammonium phosphate monobasic and citric acid may be mixed together, and then heated to form a precursor mixture.

Here, NVPF/NVPs doped with 0%, 4.9%, 8.9%, 11.5% and 14.8% Fe, respectively, may be synthesized using 3 mmol of sodium fluoride, 2 mmol, 1.8 mmol, 1.65 mmol, 1.6 mmol and 1.5 mmol, respectively, of ammonium metavanadate, 0 mmol, 0.20 mmol, 0.35 mmol, 0.40 mmol and 0.5 mmol, respectively, of iron nitrate, 2 mmol of ammonium phosphate, and 1.6 mmol of citric acid, without being limited thereto. Meanwhile, an NVPF/NVP doped with 2.8% Ti, 3,6% Cu, 1.9% Zn, 1.9% Cr and 2.6% Mn may be synthesized using TiO and metal nitrates in amounts of 0.15 mmol, 0.15 mmol, 0.1 mmol, 0.1 mmol, 0.1 mmol and 0.1 mmol, respectively, instead of iron nitrate, but is not limited thereto.

Step (b): The precursor mixture may be heated.

The drying may be performed at 80° C., and then additionally performed at 120° C., but is not limited thereto. The drying may be performed in a vacuum oven, but is not limited thereto.

Step (c): A step of heating the dried precursor mixture may be performed.

The heating may be performed at 300° C., and then additionally performed at 650° C., but is not limited thereto. The heating may be performed under an argon atmosphere, but is not limited thereto.

According to still another embodiment of the present disclosure, the present disclosure is directed to a sodium-ion battery including: the electrode according to the present disclosure; and an electrolyte.

When the electrode according to the present disclosure is a positive electrode, a negative electrode may be produced by coating a current collector directly with a negative electrode material including a negative electrode active material, or may be obtained as a negative electrode plate by casting a negative electrode material on a separate support, peeling the negative electrode material film from the support, and laminating the peeled film onto a current collector. In the present disclosure, the negative electrode is not limited to the above listed form, but may be in forms other than the above-listed forms.

When the electrode according to the present disclosure is a positive electrode, a compound (sodiated intercalation compound) capable of reversible intercalation and deintercalation of sodium may be used as the negative electrode active material. More specifically, the negative electrode active material is preferably a sodium-transition metal composite oxide, but is not particularly limited thereto. The sodium-transition metal composite oxide may be, for example, one or more selected from the group consisting of $NaMn_2O_4$, $NaNiO_2$, $NaCoO_2$, $NaFeO_2$, $NaNi_{0.5}Mn_{0.5}O_2$, $NaCrO_2$, $Na_{0.9}Mg_{0.05}Ni_{0.5}Mn_{0.5}O_2$, and $Na_{0.9}Ca_{0.05}Ni_{0.5}Mn_{0.5}O_2$. In some cases, two or more positive electrode active materials may be used in combination.

In the present disclosure, the negative electrode material may further include a binder, a solvent and optionally an electrically conductive material, in addition to a negative electrode active material layer.

In the present disclosure, the binder serves to facilitate the adhesion between electrode active material nanoplate particles and to improve the binding of the electrode active material to a current collector, and specific examples thereof include, but are not particularly limited to, polyvinyl alcohol, polyacrylic acid, carboxymethyl cellulose, hydroxypropyl cellulose, diacetyl cellulose, polyvinyl chloride, carboxylated polyvinyl chloride, polyvinyl fluoride, polymers containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

In the present disclosure, the binder may be included in an amount of 1 to 20 parts by weight based on 100 parts by weight of the negative electrode active material, but is not limited thereto.

In the present disclosure, a solvent for the binder is not particularly limited, but may be, for example, N-methylpyrrolidone (NMP), acetone or water.

In the present disclosure, the solvent is preferably included in an amount of 1 to 10 parts by weight based on 100 parts by weight of the negative electrode active material in order to facilitate an operation of forming the negative electrode material.

In addition, the negative electrode material of the present disclosure may optionally further include an electrically conductive material in order to further improve the electrical conductivity thereof. As the electrically conductive material, any material that is generally used in a sodium-ion battery may be used, and examples thereof include carbon-based materials such as carbon black, acetylene black, Ketjen black, and carbon fibers; metal-based materials such as metal powder or metal fibers such as copper, nickel, aluminum, and silver; electrically conductive polymers such as polyphenylene derivatives; or mixtures thereof. The content of the electrically conductive material that is used may be suitably controlled.

In addition, in the present disclosure, the particle size of the electrically conductive material is preferably 2 nm to 1 µm. If the particle size of the electrically conductive material is less than 2 nm, a problem may arise in that it is difficult to form a uniform slurry in a process of forming an electrode, and if the particle size is more than 1 µm, a problem may arise in that it is impossible to improve the electrical conductivity of the electrode.

In addition, in the present disclosure, the negative electrode active material and the electrically conductive material may be included at a weight ratio of, but not limited to, 1:9 to 99:1, more preferably 1:1 to 9:1.

In the present disclosure, the current collector may generally have a thickness of 3 µm to 500 µm. In the present disclosure, the current collector is not particularly limited as long as it has electrical conductivity without causing chemical changes in the battery. The current collector may be, for example, aluminum, nickel, titanium, fired carbon, copper or stainless steel, which may be optionally surface-treated with carbon, nickel, titanium, silver, or the like. Alternatively, the current collector may be an aluminum-cadmium alloy. In addition, fine irregularities may be formed on the surface of the current collector to enhance the binding force of the positive electrode active material to the surface, and the current collector may be used in various forms such as a film, a sheet, a foil, a net, a porous material, foam, and a non-woven fabric.

In the present disclosure, the electrolyte may include a liquid electrolyte, a solid electrolyte, or a combination thereof. The liquid electrolyte may include a sodium salt, an organic solvent, or a combination thereof, and the solid electrolyte may include an organic solid electrolyte containing a polymer compound, an inorganic solid electrolyte, or a combination thereof.

In the present disclosure, when the electrolyte is a liquid electrolyte, it includes an electrolyte salt and a solvent.

The electrolyte salt that is used in the present disclosure may be specifically any one or a mixture of two or more selected from among sodium-containing hydroxides (e.g., sodium hydroxide (NaOH), etc.), borates (e.g., sodium metaborate ($NaBO_2$), borax ($Na_2B_4O_7$), boric acid ($H_3BO_3$), etc.), phosphates (e.g., sodium phosphate tribasic ($Na_3PO_4$), sodium pyrophosphate ($Na_2HPO_4$), etc.), chloric acid (e.g., $NaClO_4$, etc.), $NaAlCl_4$, $NaAsF_6$, $NaBF_4$, $NaPF_6$, $NaSbF_6$, $NaCF_3SO_3$, and $NaN(SO_2CF_3)_2$.

In the present disclosure, the electrolyte may include the electrolyte salt in an amount of 2 to 5 wt % based on the total weight of the electrolyte.

In addition, in the present disclosure, the solvent may be used without particular limitation, as long as it may serve as a medium through which ions involved in the electrochemical reaction of the battery may move. Specifically, the solvent may be an aqueous solvent such as water or an alcohol, or a non-aqueous solvent such as an ester solvent, an ether solvent, a ketone solvent, an aromatic hydrocarbon solvent, an alkoxyalkane solvent, or a carbonate solvent. It is possible to use one or a mixture of two or more selected from among these solvents.

In particular, a preferred solvent that is used in the present disclosure may be an ester-based solvent, specific examples of which include methyl acetate, ethyl acetate, n-propyl acetate, dimethyl acetate, methyl propionate, ethyl propionate, γ-butyrolactone, decanolide, γ-valerolactone, mevalonolactone, γ-caprolactone, δ-valerolactone, or ε-caprolactone.

More preferred examples of the ether-based solvent include diethylene glycol dimethyl ether (diglyme), dibutyl ether, tetraglyme, 2-methyltetrahydrofuran, or tetrahydrofuran.

In the present disclosure, specific examples of the ketone-based solvent include cyclohexanone. Specific examples of the aromatic hydrocarbon-based organic solvent include benzene, fluorobenzene, chlorobenzene, iodobenzene, toluene, fluorotoluene, or xylene. Examples of the alkoxyalkane solvent include dimethoxyethane or diethoxyethane.

In the present disclosure, specific examples of the carbonate solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or fluoroethylene carbonate (FEC).

In addition, in the present disclosure, when the electrolyte is a solid electrolyte, it is possible to use especially an organic polymer electrolyte such as a polyethylene oxide-based polymer compound, or a polymer compound containing at least one of a polyorganosiloxane chain or a polyoxyalkylene chain. In addition, it is also possible to use a so-called gel type in which a non-aqueous electrolyte solution is held in a polymer compound. Furthermore, it is possible to use inorganic solid electrolytes, including sulfide electrolytes such as $Na_2S$—$SiS_2$ or $Na_2S$—$GeS_2$, and NASICON-type electrolytes such as $NaZr_2(PO_4)_3$. The use of these solid electrolytes further increase safety in some cases.

In addition, when a solid electrolyte is used in the sodium secondary battery of the present disclosure, the solid electrolyte may serve as a separator, and in this case, no separate separator is required.

In addition, the electrolyte may further include additives (hereinafter referred to as "other additives") that may be generally used in an electrolyte for the purpose of improving the life characteristics of the battery, suppressing the decrease in battery capacity and improving the discharge capacity of the battery, in addition to the above-described electrolyte constituents.

In the present disclosure, the electrolyte preferably further contains 0.1 to 5 wt % of fluoroethylene carbonate.

When the sodium-ion battery of the present disclosure includes a solid electrolyte as an electrolyte as described above and the solid electrolyte serves as a separator, the sodium-ion battery may require no separate separator, but if not, the sodium-ion battery may further include a separator.

In the present disclosure, the separator separates the negative electrode and the positive electrode from each other, and provides a channel for sodium ions to move, and any separator may be used as long as it is commonly used in batteries that use sodium ions. That is, it is possible to use a separator having excellent electrolyte solution moisturizing ability while having low resistance to electrolyte ion movement. For example, the separator may be selected from among glass fibers, polyester, Teflon, polyethylene, polypropylene, polytetrafluoroethylene (PTFE), or combinations thereof, and may be in the form of nonwoven fabric or woven fabric. Preferably, a polyolefin-based polymer separator such as polyethylene or polypropylene is mainly used for the sodium secondary battery, and a coated separator containing a ceramic component or a polymer material may also be used to ensure heat resistance or mechanical strength. Optionally, the separator may have a single-layer or multi-layer structure.

In addition, the sodium secondary battery of the present disclosure may further include fluoroethylene carbonate (FEC), vinylene carbonate (VC) or a combination thereof as an additive.

Hereinafter, the present disclosure will be described in more detail with reference to examples. It will be obvious to those skilled in the art that these examples serve merely to illustrate the present disclosure in more detail, and the scope of the present disclosure according to the subject matter of the present disclosure is not limited by these examples.

EXAMPLES

[Example 1] Production of Compounds

NVPF/NVP composites were synthesized using a general sol-gel method. Meanwhile, the synthesis method according to the present disclosure was performed to synthesize a NVPF single phase, but the synthesized sample is referred to as NVPF/NVP because it also contains NVP and $Na_5V_{1-x}Fe_x(PO_4)_2F_2$ as minor phases depending on the Fe content. Sodium fluoride, ammonium metavanadate, ammonium phosphate monobasic and citric acid were purchased from Sigma-Aldrich. To synthesize NVPF/NVP doped with 0%, 4.9%, 8.9%, 11.5% or 14.8% Fe, 3 mmol of sodium fluoride, 2 mmol, 1.8 mmol, 1.65 mmol, 1.6 mmol or 1.5 mmol of ammonium metavanadate, 0 mmol, 0.20 mmol, 0.35 mmol, 0.40 mmol or 0.5 mmol of iron nitrate, 2 mmol of ammonium phosphate, and 1.6 mmol of citric acid were mixed together, and heated until a blue liquid was obtained, thus producing precursor mixtures. To synthesize a NVPF/NVP doped with 2.8% Ti, 3.6% Cu, 1.9% Zn, 1.9% Cr and 2.6% Mn, TiO and metal nitrates were used instead of iron nitrate in amounts of 0.15 mmol, 0.15 mmol, 0.1 mmol, 0.1 mmol, 0.1 mmol, and 0.1 mmol, respectively. Thereafter, each of the precursor mixtures was placed in a vacuum oven and dried at 80° C. until a gel was formed. Next, each of the precursor mixtures was completely dried at 120° C. Thereafter, each of the resulting precursor mixtures was ground, pressed to make a pellet, heated at 300° C. for 4 hours under an argon atmosphere, and then additionally heated at 650° C. for 8 hours. The content of the doped transition metal in each of the synthesized materials was analyzed by inductive coupled plasma-mass spectrometry.

In order to confirm the three-dimensional structure and crystal structure of each of the compounds synthesized as described above, a transmission electron microscope (TEM, JEOL2100F) and an X-ray diffraction analyzer (XRD, RIGAKU, D/MAX-2500) were used.

Figure 1A:
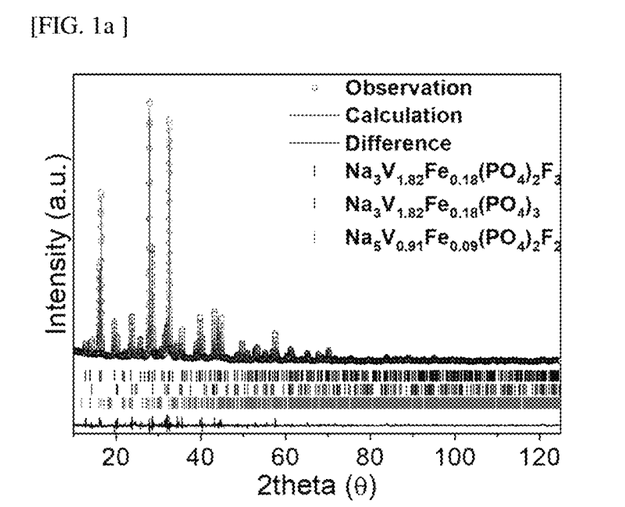
FIG. 1(a) shows an XRD graph of a material having an Fe content of 8.9 at %, among electrode materials produced in Example 1 of the present disclosure.
Figure 1B:
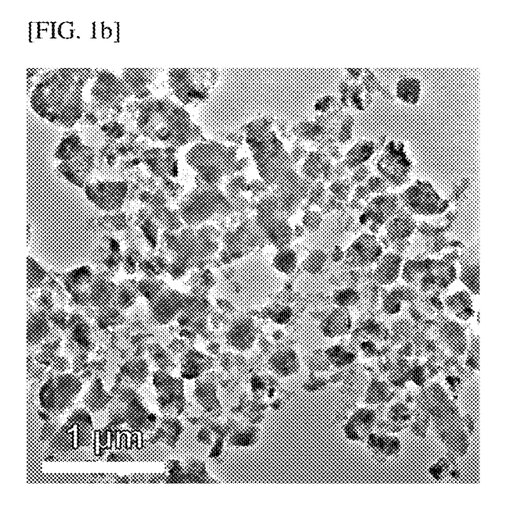
FIG. 1(b) shows a low-magnification transmission electron micrograph of an electrode material according to the present disclosure.
Figure 1C:
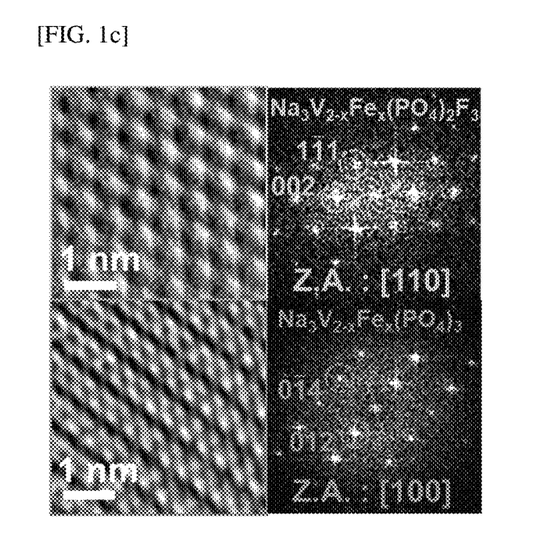
FIG. 1(c) shows a high-magnification transmission electron micrograph of the electrode material according to the present disclosure.
Figure 1D:
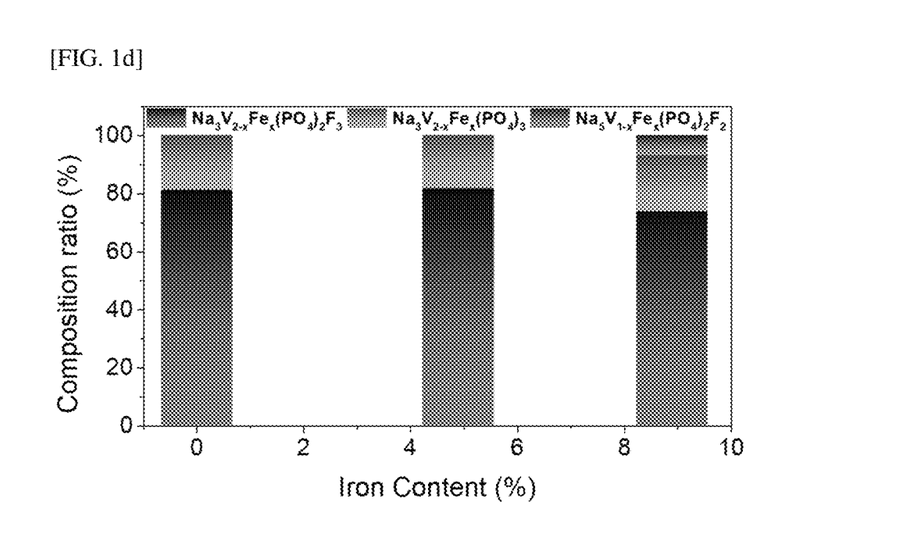
FIG. 1(d) shows the ratio between NVPF, NVP and $Na_5V_{1-x}Fe_x(PO_4)_2F_2$ in the electrode material according to the present disclosure.
Figure 1E:
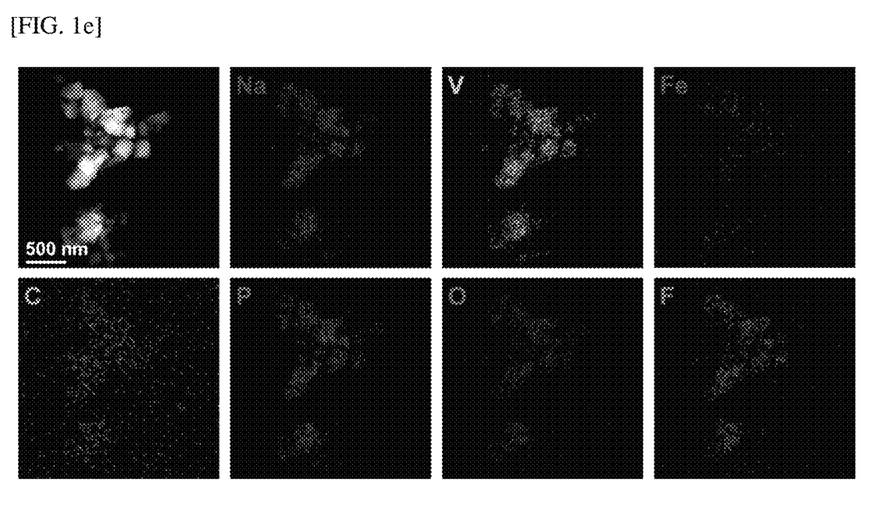
FIG. 1(e) shows an element mapping of an NVPF/NVP having an Fe content of 8.9% according to the present disclosure.

[Example 2] XRD Graphs, X-Ray Diffraction (XRD) and Morphology Analyses of Compounds For the synthesized electrode materials, XRD analysis was performed. As a result, it was confirmed that all the electrode materials contained both (NVPF) and (NVP) phases doped with Fe and also contained a small amount of a $Na_5V_{1-x}Fe_x(PO_4)_2F_2$ phase depending on the Fe content. Thus, the electrode materials are named NVPF/NVP (Fe x %, x=vanadium substitution rate). It was confirmed that NVPF/NVP (8.9% Fe) shown to have the best performance had a particle size of 1 μm or less and was mostly distributed between 10 nm and 500 nm. The fact that the synthesized electrode materials contained both the NVPF and NVP phases was also confirmed through the high-resolution transmission electron microscope image shown in FIG. 1c. The image in FIG. 1c is an image obtained from the NVPF/NVP (8.9% Fe) sample. The ratio between NVPF, NVP and $Na_5V_{1-x}Fe_x(PO_4)_2F_2$ phases in each of the electrode materials was confirmed to be 81.16:18.84:0 in the electrode material containing no Fe, 81.67:18.33:0 in the electrode material containing 4.9% Fe, and 73.63:19.45:6.92 in the electrode material containing 8.9% Fe (FIG. 1d). FIG. 1e depicts EDS mapping images showing the distributions of elements in the NVPF/NVP (8.9% Fe) sample, and as can be seen therein, the sample was well doped with Fe.

Figure 2A:
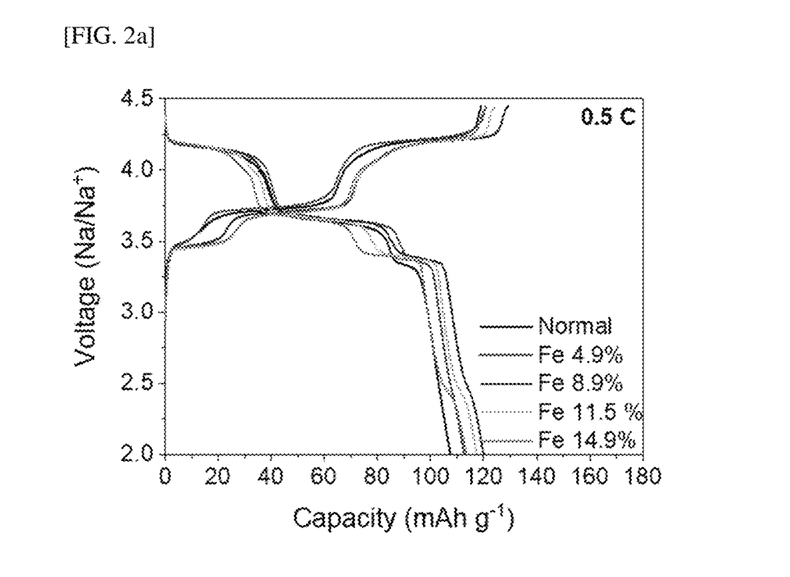
FIG. 2(a) shows the charge and discharge profiles of each of the electrode materials, produced in Example 1 of the present disclosure, at 0.5 C depending on the Fe content thereof.
Figure 2B:
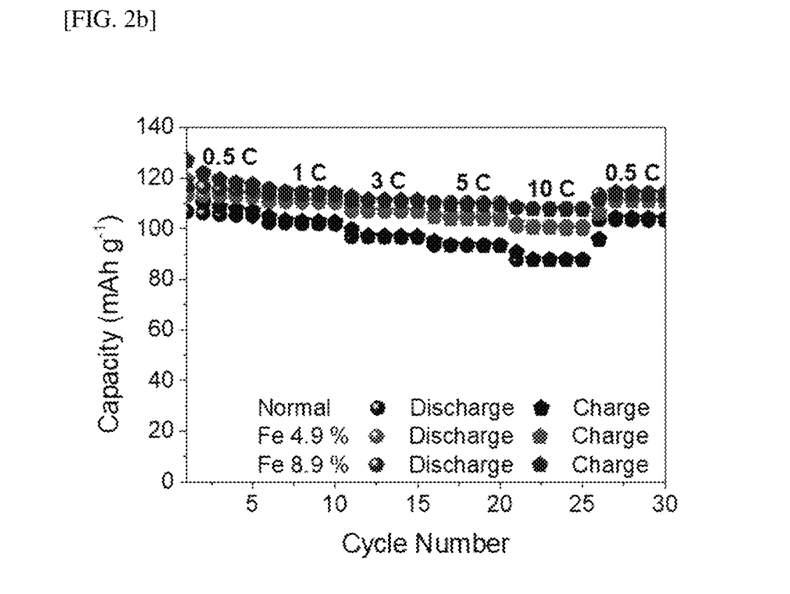
FIG. 2(b) graphically shows changes in the charge capacity and discharge capacity of each of the electrode materials, produced in Example 1 of the present disclosure, at various current densities (0.5 C, 1 C, 3 C, 5 C and 10 C, 1 C=128 mAh/g) depending on the Fe content thereof.
Figure 2C:
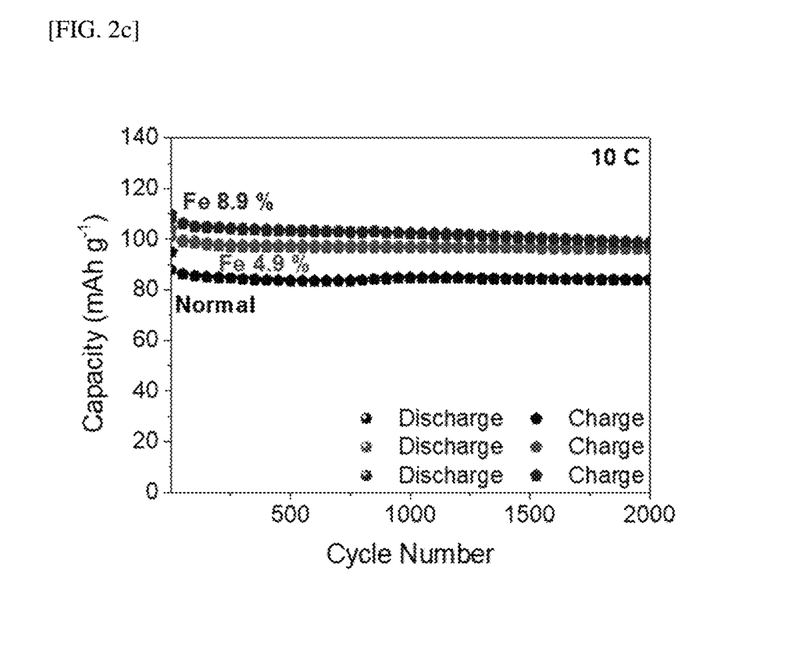
FIG. 2(c) graphically shows changes in the charge capacity and discharge capacity of each of the produced electrode materials at 10 C as a function of cycle number depending on the Fe content (0, 4.9% or 8.9%) thereof.
Figure 2D:
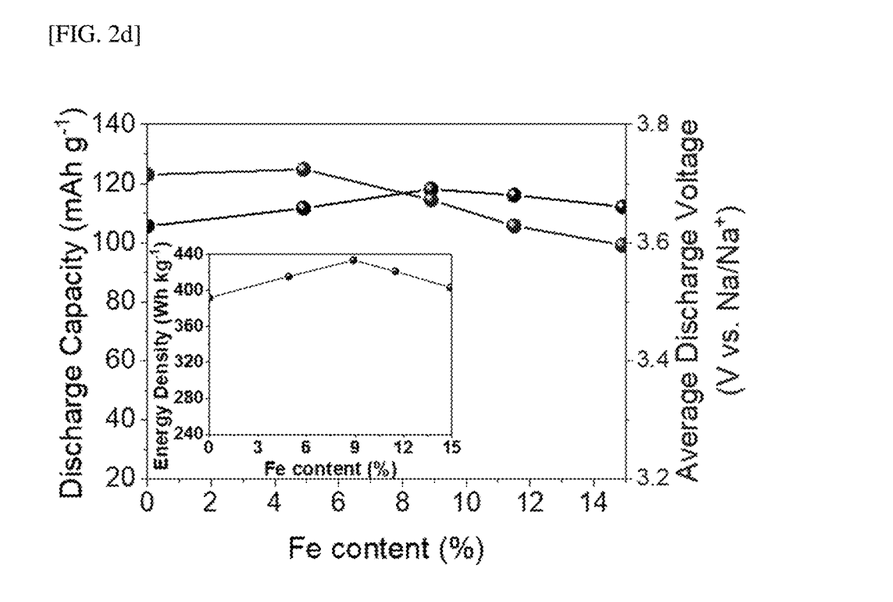
FIG. 2(d) graphically shows changes in the average discharge voltage, discharge capacity and energy density of each of the electrode materials, produced in Example 1 of the present disclosure, depending on the Fe content thereof.

[Example 3] Charge and Discharge Profiles of Sodium-Ion Battery Depending on Fe Content of Compound Charge and discharge profiles of NVPF/NVPs (0%, 4.9%, and 8.9% Fe) depending on the Fe content were obtained at a current density of 0.5 C (FIG. 2a). As a result, the average voltage remained higher than 3.7 V until Fe was increased to 4.9% (FIG. 2d). When Fe was further increased from 4.9%, the average voltage began to drop below 3.7 V, and when 8.9% Fe was contained, the average voltage decreased to 3.67 V, but the discharge capacity reached the highest value (about 120 mAh/g). In addition, considering the prices of vanadium and Fe, when 8.9% Fe is contained, the vanadium content can be reduced by 8.9%, which means that raw material cost can be reduced by about 8.9%. The prices of $V_2O_5$ and iron ore are 14,175 USD/ton and 96.7 USD/ton, respectively (as of Jan. 24, 2020).

[Example 4] Sodium Storage Performance of Sodium-Ion Battery Depending on Fe Content of Compound The NVPF/NVP containing no Fe showed a charge capacity of 119.1 mAh/g and a discharge capacity of 107.48 mAh/g. The NVPF/NVPs doped with 4.9%, 8.9%, 11.5% and 14.9% Fe showed charge capacities of 120.97 mAh/g, 129.17 mAh/g, 124.39 mAh/g and 124.14 mAh/g respectively, and discharge capacities of 112.61 mAh/g, 119.96 mAh/g, 117.34 mAh/g and 113.46 mAh/g, respectively (FIG. 2a). When the Fe content was 8.9%, the charge and discharge capacities were 129.2 mAh/g and 119.96 mAh/g, respectively, which were the highest values, and the storage capacity performance was higher while Fe replaced vanadium (FIG. 2a). It was confirmed that, when the Fe content was more than 8.9%, the charge and discharge capacities and the discharge voltage decreased, and the NVPF/NVPs having Fe contents of 11.5% and 14.9% showed average discharge voltages of 3.63 and 3.60 V, respectively. However, the two NVPF/NVPs all still showed higher performance in terms of energy density than the NVPF/NVP not doped with Fe. The NVPF/NVP doped with no Fe and the NVPF/NVPs doped with 4.9%, 8.9%, 11.5% and 14.9% Fe showed energy densities of 392.11, 415.9, 433.73, 421.13 and 403.43 Wh/kg, respectively.

The NVPF/NVPs doped with Fe also showed higher performance even at a high current density. As a result of measuring the performance of the NVPF/NVPs (0%, 4.9% and 8.9% Fe) depending on current density, it was confirmed that the NVPF/NVP containing no Fe showed a discharge capacity of 87.9 mAh/g at 10 C, whereas the NVPF/NVPs (4.9% and 8.9% Fe) showed discharge capacities of 101 mAh/g and 108 mAh/g, respectively.

Figure 3:
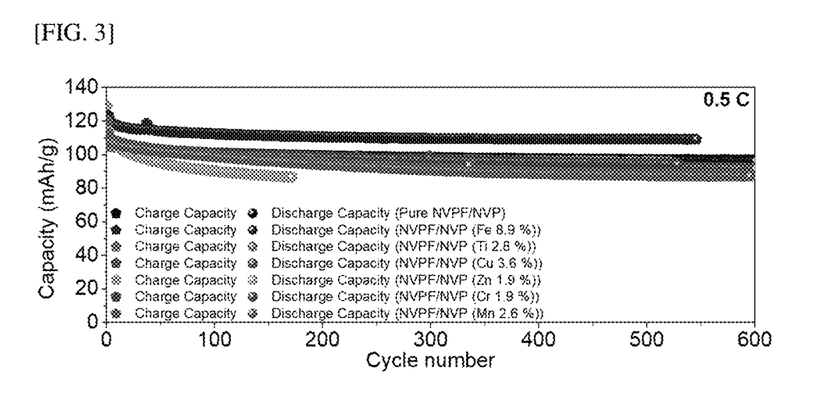
FIG. 3 graphically shows changes in the charge capacity and discharge capacity of each of produced electrode materials doped with Fe, Ti, Cu, Zn, Cr and Mn, respectively, at 0.5 C as a function of cycle number.

[Example 5] Sodium Storage Performance of Electrode Materials Doped with Transition Metals Other than Fe As can be confirmed from FIG. 3, it appears that transition metals other than Fe are not useful, because the performance of the electrode materials doped with the transition metals is lower than that before doping even when the doping amounts (contents) of the transition metals exceed 3.6%.

[Example 6] Analysis of Sodium-Ion Diffusivity of NVPF/NVP Doped with Fe

Sodium-ion diffusivity and electrical conductivity are factors that affect sodium ion storage performance. Since the performance of the NVPF/NVP composites significantly increased due to Fe doping, it appears that the two factors also greatly changed.

Figure 4A:
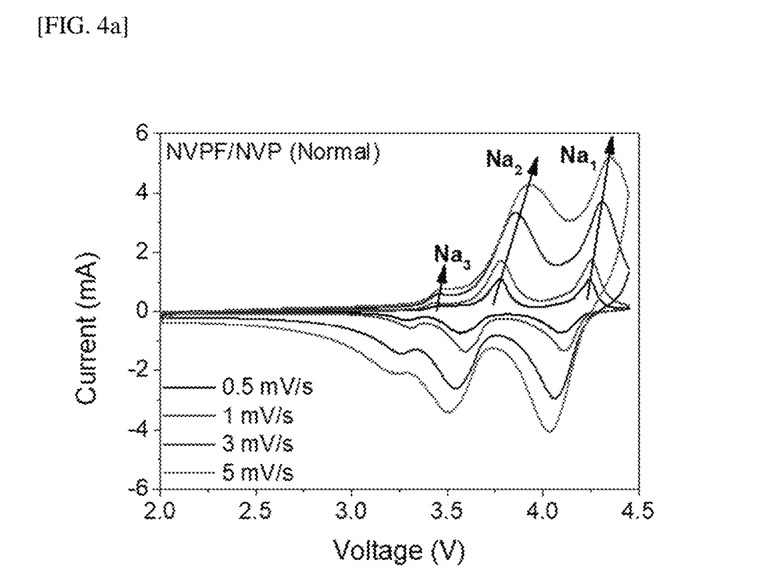
FIG. 4(a) shows the cyclic voltammetry profiles of an electrode material containing no Fe at a voltage ranging from 2 V to 4.45 V and voltage scan rates of 0.5 mV/s, 1 mV/s, 3 mV/s and 5 mV/s.
Figure 4B:
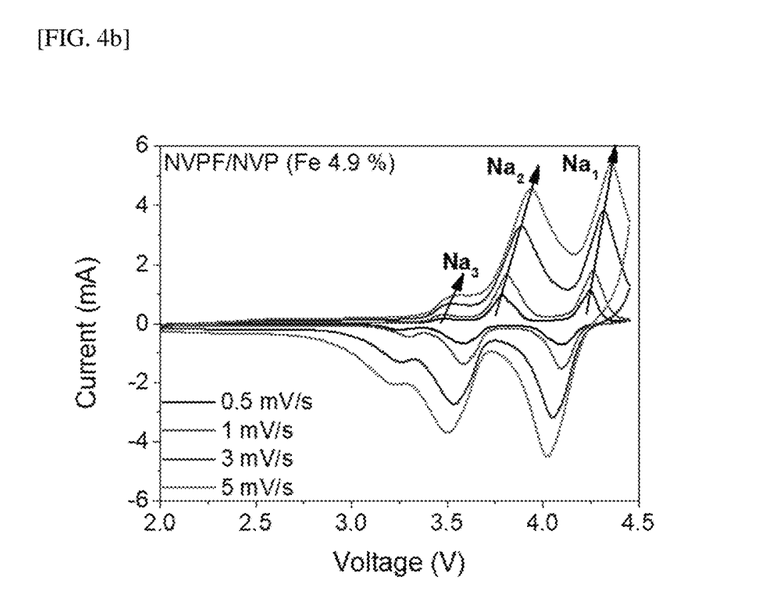
FIG. 4(b) shows the cyclic voltammetry profiles of an electrode material containing 4.9% Fe at a voltage ranging from 2 V to 4.45 V and voltage scan rates of 0.5 mV/s, 1 mV/s, 3 mV/s and 5 mV/s.
Figure 4C:
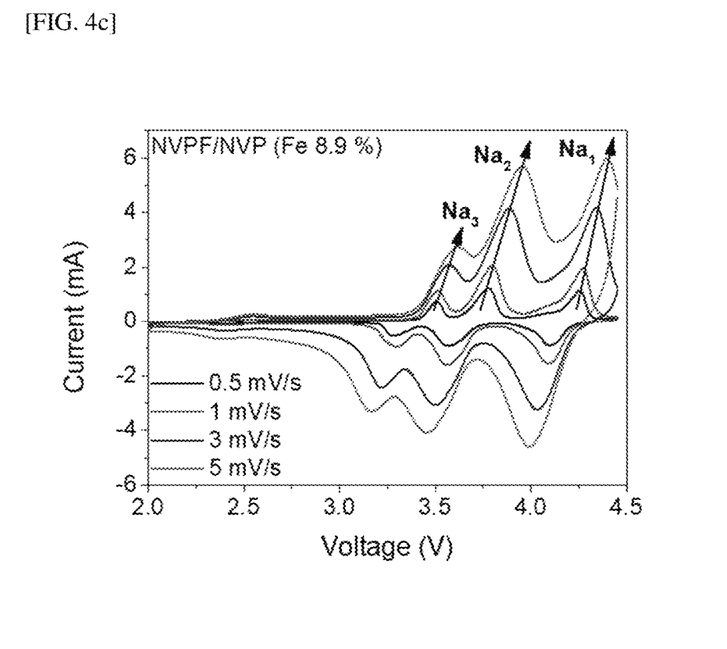
FIG. 4(c) shows the cyclic voltammetry profiles of an electrode material containing 8.9% Fe at a voltage ranging from 2 V to 4.45 V and voltage scan rates of 0.5 mV/s, 1 mV/s, 3 mV/s and 5 mV/s.
Figure 4D:
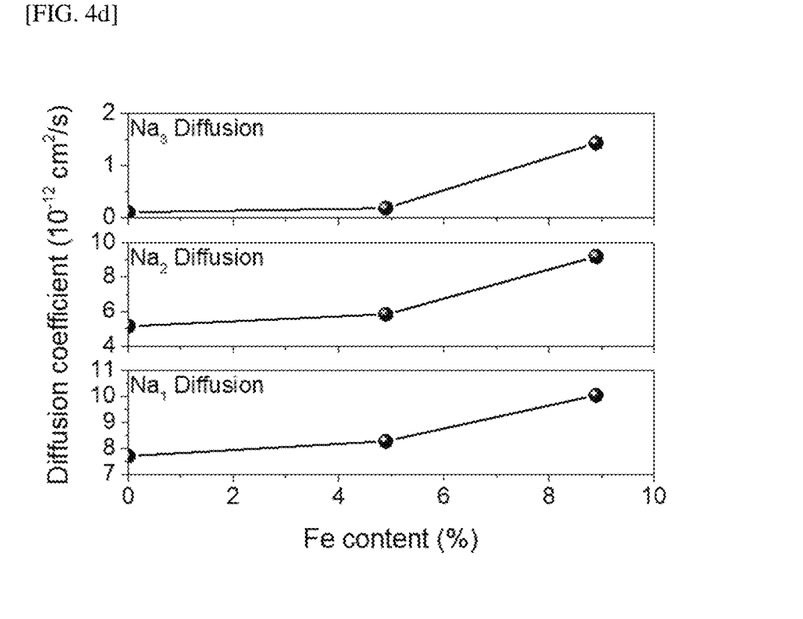
FIG. 4(d) shows changes in sodium-ion diffusion coefficient in various voltage plateaus based on FIGS. 4(a), 4(b) and 4(c).

To measure these factors, sodium-ion diffusion coefficient was determined by cyclic voltammetry. If the current peak increases linearly with the voltage scan rate, the sodium-ion diffusion coefficient can be determined using the following Randles-Sevcik equation:

$$i_p = 2.686 \times n^{\frac{3}{2}} A D^{\frac{1}{2}} C v^{\frac{1}{2}}$$

wherein $i_p$ is the peak current, n is the number of electrons involved (n=2), A is the electrode area, D is the diffusion coefficient, C is the sodium concentration, and v is the voltage scan rate. The sodium diffusion coefficient determined using the equation and FIGS. 4a, 4b and 4c is graphically shown in FIG. 4d as a function of the Fe content. As a result, it could be confirmed that, as the Fe doping content increased, the sodium diffusion coefficient noticeably increased.

Although the above results have been described in detail with respect to the present disclosure, it will be obvious to those skilled in the art that the scope of the present disclosure is not limited thereto, and various modifications and variations are possible, without departing from the technical spirit of the present disclosure as described in the claims. In particular, the NVPF/NVPs in this Example showed the best performance when the content of Fe was 8.9%, but the Fe content at which the best performance is shown may sufficiently change depending on the synthesis method, the sintering temperature and gas atmosphere conditions, or the pelletizing pressure. In the same context, the ratio between NVPF, NVP and $Na_5V_{1-x}Fe_x(PO_4)_2F_2$ may also change.

[Example 7] Use of NVPF/NVP Doped with 8.9% Fe as Full-Cell Positive Electrode Material for Sodium-Ion Battery A sodium-ion battery that uses bulk copper sulfide and NVPF/NVP (8.9% Fe) as a negative electrode and a positive electrode, respectively, was fabricated. In order to optimize the performance of the sodium-ion battery, the bulk copper sulfide was repeatedly charged and discharged with sodium before being used as an electrode. The mass ratio of positive electrode material: negative electrode material was about 3.43:1.

Figure 5A:
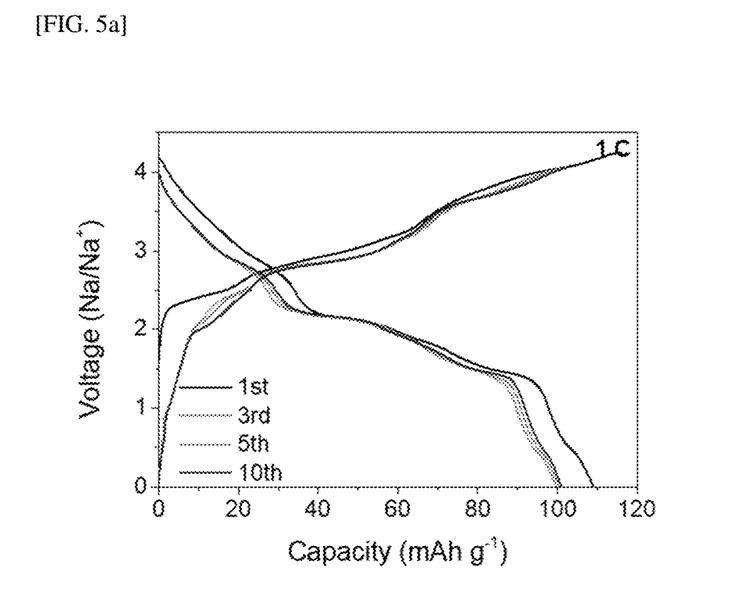
FIG. 5(a) shows the $1^{st}$, $3^{rd}$, $5^{th}$ and $10^{th}$ charge and discharge profiles of a CuS-NVPF/NVP (8.9% Fe) sodium-ion battery at 0.128 mA/g.
Figure 5B:
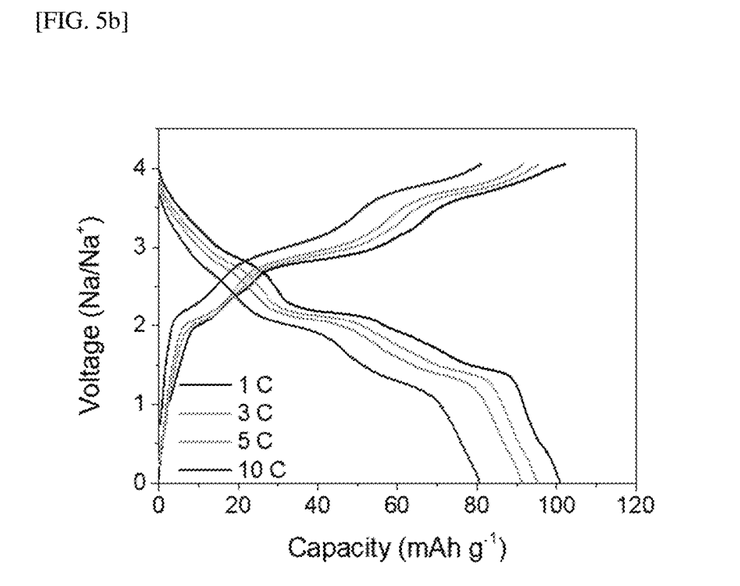
FIG. 5(b) shows the charge and discharge profiles of the CuS-NVPF/NVP (8.9% Fe) sodium-ion battery at 0.128 mA/g, 0.384 mA/g, 0.640 mA/g and 1.28 A/g.
Figure 5C:
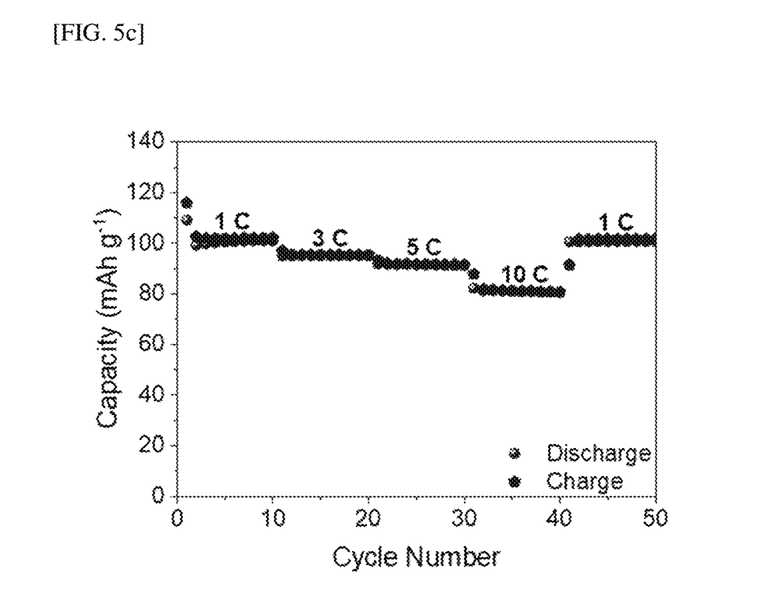
FIG. 5(c) shows the cycle stability of the CuS-NVPF/NVP (8.9% Fe) sodium-ion battery at 0.128 mA/g, 0.384 mA/g, 0.640 mA/g and 1.28 A/g.
Figure 5D:
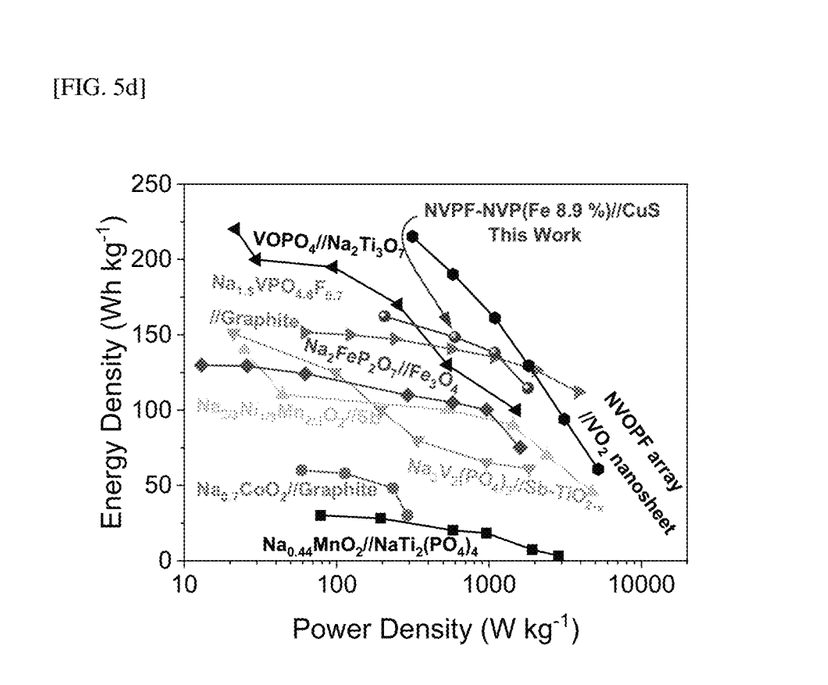
FIG. 5(d) shows the superiority of the CuS-NVPF/NVP (8.9% Fe) sodium-ion battery compared to previously reported sodium-ion batteries.
Figure 5E:
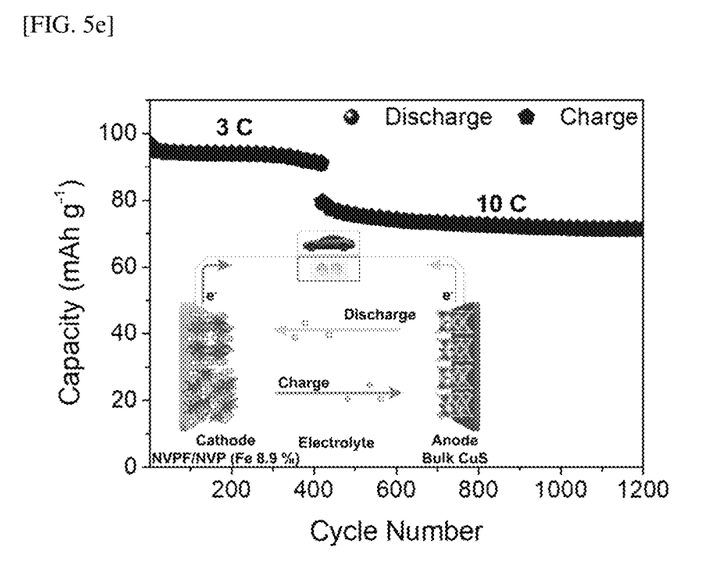
FIG. 5(e) is a graph showing the long-life cycle stability of the CuS-NVPF/NVP (8.9% Fe) sodium-ion battery.

The finished sodium-ion battery was charged to 4.25 V in the first cycle and then operated at a voltage ranging from 0 to 4.05 V. As a result, the battery showed an average voltage of 2.09 V at 1 C (128 mAh/g, based on positive electrode), and achieved an energy density of 162.2 Wh/kg (based on the mass of negative electrode+positive electrode) (FIG. 5a). In addition, it was confirmed that, as the current density increased to 3 C, 5 C and 10 C, the battery could have energy densities of 148.59 Wh/kg, 138.27 Wh/kg and 114.6 Wh/kg, respectively, and the battery showed a stable storage capacity at each current density (FIGS. 5b and 5c). The finished sodium-ion battery exhibited high performance even compared to the sodium-ion batteries reported to date (FIG. 5d). In addition, the finished sodium-ion battery has excellent long-life cycle performance. Specifically, the battery maintained a storage capacity of about 95% even after 450 charge/discharge cycles, and maintained a storage capacity of about 88% even after 1,250 charge/discharge cycles (FIGS. 5c and 5e).

As described above, the present disclosure provides a sodium-ion storage material having a reduced content of expensive vanadium as a result of transition metal doping, and an electrode material for a sodium-ion battery including the same. When this sodium-ion storage material is used, it may maintain high discharge capacity, and when the sodium-ion storage material is applied to a sodium-ion secondary battery, this battery may exhibit excellent charge/discharge cycle characteristics.

What is claimed is:

1. A sodium-ion storage material comprising
an $Na_3V_{2-x}M_x(PO_4)_2F_3/Na_3V_{2-x}M_x(PO_4)_3$ composite $(0<x<2)$,
wherein M is a transition metal.

2. The sodium-ion storage material of claim 1, wherein the transition metal is any one selected from the group consisting of Fe, Ti, Cu, Cr, Mn and Zn.

3. The sodium-ion storage material of claim 1, wherein the transition metal is Fe.

4. An electrode material for a sodium-ion battery comprising the sodium-ion storage material of claim 3 as an electrode active material.

5. The electrode material of claim 4, wherein the electrode active material is coated with one or more selected from the group consisting of electrically conductive carbon, precious metals, and metals.

6. The electrode material of claim 4, wherein the electrode material further comprises a binder.

7. The electrode material of claim 6, wherein the binder comprises one or more selected from the group consisting of polyvinylidene fluoride, polyvinyl alcohol, polyacrylic acid, alginic acid, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, and fluorinated rubber.

8. The electrode material of claim 7, wherein the electrode material further comprises an electrically conductive material.

9. An electrode for a sodium-ion battery comprising the electrode material of claim 4.

10. A sodium-ion battery or sodium-magnesium hybrid-ion battery comprising: the electrode of claim 9; and an electrolyte.

11. A method for producing a sodium-ion storage material according to claim 1, the method comprising steps of:
(a) mixing sodium fluoride, ammonium metavanadate, ammonium phosphate monobasic and citric acid, followed by heating to form a precursor mixture;
(b) drying the precursor mixture; and
(c) heating the dried precursor mixture.

12. The method of claim 11, wherein the step of drying the precursor mixture is performed at a temperature of 80° C., and then additionally performed at a temperature of 120° C.

13. The method of claim 11, wherein the method further comprises a step of pressing the dried precursor mixture into a pellet, before the step of heating the dried precursor mixture, and the step of heating the dried precursor mixture is performed at a temperature of 300° C., and then additionally performed at a temperature of 650° C.

14. The method of claim 11, wherein the step of heating the dried precursor mixture is performed under an argon atmosphere.

* * * * *